US010088880B2

(12) United States Patent
Sundaram et al.

(10) Patent No.: US 10,088,880 B2
(45) Date of Patent: Oct. 2, 2018

(54) THERMAL MONITORING OF MEMORY RESOURCES

(71) Applicant: Intel Corporation, Santa Clara, CA (US)

(72) Inventors: Rajesh Sundaram, Folsom, CA (US); Muthukumar P. Swaminathan, Folsom, CA (US); Doyle Rivers, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 14/837,372

(22) Filed: Aug. 27, 2015

(65) Prior Publication Data
US 2017/0060202 A1 Mar. 2, 2017

(51) Int. Cl.
*G06F 1/20* (2006.01)
*G06F 1/32* (2006.01)

(52) U.S. Cl.
CPC ............ *G06F 1/206* (2013.01); *G06F 1/3225* (2013.01); *G06F 1/3275* (2013.01)

(58) Field of Classification Search
None
See application file for complete search history.

(56) References Cited

U.S. PATENT DOCUMENTS

| | | | | |
|---|---|---|---|---|
| 2003/0210505 A1* | 11/2003 | Partsch | ............ | G11C 7/04 361/103 |
| 2006/0242447 A1* | 10/2006 | Radhakrishnan | ....... | G06F 1/206 713/501 |
| 2007/0047378 A1 | 3/2007 | Wolford et al. | | |
| 2007/0211548 A1* | 9/2007 | Jain | ............ | G11C 5/04 365/211 |
| 2008/0052483 A1* | 2/2008 | Rangarajan | ............ | G06F 1/206 711/170 |
| 2011/0040517 A1 | 2/2011 | Johns et al. | | |
| 2012/0095719 A1 | 4/2012 | Araki et al. | | |
| 2014/0047285 A1 | 2/2014 | Baranwal et al. | | |
| 2014/0101371 A1* | 4/2014 | Nguyen | ............ | G06F 3/0616 711/103 |

OTHER PUBLICATIONS

International Search Report issued in PCT Application No. PCT/US2016/043910, dated Oct. 24, 2016.
International Preliminary Report on Patentability and Written Opinion issued in PCT Application No. PCT/US2016/043910, dated Mar. 8, 2018, 12 pages.

* cited by examiner

*Primary Examiner* — Dennis M Butler
(74) *Attorney, Agent, or Firm* — Grossman, Tucker, Perreault & Pfleger, PLLC

(57) ABSTRACT

Data reliability and integrity may be compromised when memory resources used to store the data reach elevated temperatures. A sensor in the memory resource may monitor the temperature of the memory resource in real-time. A comparator in the memory resource may indicate a high temperature condition to a memory controller. The memory controller, in response to the high temperature condition, can restrict or halt data flow to the memory resource. When the real-time temperature of the memory resource falls below a defined threshold, the memory controller may resume data flow to the memory resource.

18 Claims, 4 Drawing Sheets

THERMAL MONITORING OF MEMORY RESOURCES

TECHNICAL FIELD

The present disclosure relates to data storage systems.

BACKGROUND

Generally, all memory resources share the ability to store data in some form, most often in binary form as a sequence of ones and zeros. Contemporary electronic data storage frequently involves very high data flow rates into and out of a storage device within the memory resource. Such storage devices may include one or more of: magnetic, electromagnetic, electroresistive, phase change, quantum, and electrostatic storage media. Since most storage devices are at their core electrical devices, heat may be generated as a byproduct of the data storage and retrieval process. Where these data storage and retrieval processes occur rapidly, the rate of heat buildup within the memory resource can overwhelm the ability of the memory resource to reject the heat to the surrounding environment. The inability to reject sufficient heat to the environment may adversely impact the performance of the memory resource. At times, heat buildup within the memory resource may affect the reliability and/or integrity of the data stored in the memory resource. For example, phase change storage devices rely upon changes in temperature to effect the phase change and consequent data storage within the storage device. As temperatures within such storage units increase, the reliability and/or integrity of data stored within the memory resource may be compromised.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
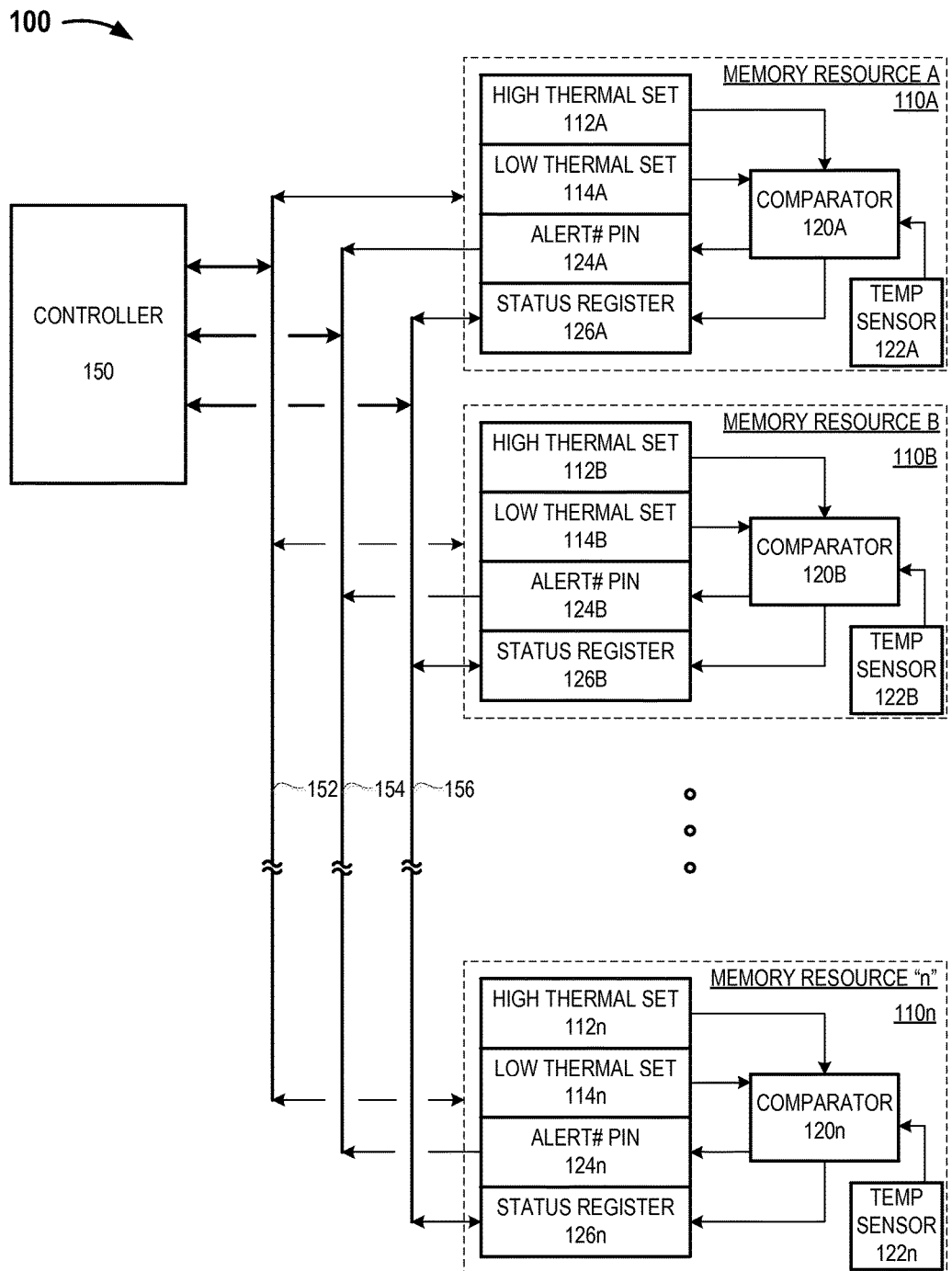
FIG. 1 is a schematic depicting an example memory device thermal monitoring system, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

As data storage systems evolve and new data storage systems are developed, thermal monitoring and management of the data storage system becomes critical. Such thermal monitoring and management is preferably conducted in a real-time manner where one or more thermal sensors within the data storage device monitor and manage the temperature within the data storage system on a real-time basis. At times, it may become critical to sense the thermal value of a memory device to maintain the integrity and reliability of the data stored in the memory device. Further, it may become necessary to suspend memory operations to some or all of a memory device when an abnormal thermal condition (e.g., a temperature exceeding a defined threshold value) exists within some or all of the storage device.

A memory controller allocates memory resources to various resource consumers (e.g., applications) and directs the flow of data to the allocated memory resources. In addition to allocating and controlling memory resources, the memory controller may also monitor memory resource parameters, such as temperature, and adjust the flow of data to the various memory resources based, at least in part, on the memory resource parameters. For example, the memory controller may reduce the speed or volume of data directed to a particular memory resource as the temperature of the resource increases and may conversely increase the speed or volume of data directed to a particular memory resource as the temperature of the resource decreases.

A number of buses may communicably couple the memory controller to each of the memory resources. At times, each of the memory resources may include a number of registers used to store thermal data. Such thermal data may include data indicative of a first threshold temperature at or above which the memory resource generates a high-temperature alert. Upon receipt of the high-temperature alert, the memory controller may restrict, throttle, limit, or even halt the flow of data to the respective memory resource. Data traffic to the memory resource may be throttled gradually or continuously over a range as the temperature increases in the memory resource (i.e., data traffic is restricted smoothly over a range and inversely proportional to the temperature of the memory resource). Data traffic to the memory resource may be incrementally throttled over a range as the temperature increases in the memory resource (i.e., data traffic is restricted stepwise over a range and inversely proportional to the temperature of the memory resource.

When the memory resource cools to a temperature at or below a second threshold temperature the memory controller may resume the flow of data to the respective memory resource. By sensing the temperature of the memory resource on a real time basis, each memory resource is able to notify the memory controller of a high temperature condition in a timely manner that reduces the risk to data integrity or reliability.

In the embodiments disclosed herein and in further embodiments, each of a number of memory resources are equipped with a comparator to compare the temperature of the respective memory resource to a configurable high temperature threshold value. Upon reaching a first threshold temperature, the comparator in the respective memory resource communicates an alert to a thermal management controller. In embodiments, the alert provided by the comparator may be communicated to the thermal management controller without an identifying the respective memory resource responsible for generating the alert. The thermal management controller determines which memory resource(s) are in a high thermal condition and restricts, throttles, or limits data traffic to and/or from the identified memory resource(s), thereby improving the reliability and integrity of the stored data. The thermal management controller may be a stand-alone configurable circuit (e.g., a stand-alone controller) or integrated into a larger configurable circuit (e.g., a sub-controller of a larger controller). The thermal management controller may include, in whole or in part, a hardwired circuit within a processor remote from the memory resource or a stand-alone hardwired circuit either co-located with the memory resource or remote from the memory resource.

A memory resource thermal monitoring system is provided. The monitoring system may include a plurality of memory resources. Each of the plurality of memory resources may include at least one thermal sensor and at least one comparator. Each of the memory resources may set an first output pin to a first logical state and write data to a register in response to a temperature of the respective memory resource at or above a first temperature threshold. The data written to the status register may include data indicative of the high temperature condition within the memory resource. Each of the memory resources may also set the first output pin to a second logical state responsive to the temperature of the respective memory resource at or below a second temperature threshold. The monitoring system may further include at least one thermal management controller communicably coupled to each of the plurality of memory resources. The at least one thermal management controller may restrict, throttle, or otherwise limit the flow of data to a memory resource when the first output pin on the respective memory resource is in the first logical state.

A thermal management controller is provided. The thermal management controller may include a communications port. The thermal management controller may also include at least one storage device that includes one or more sets of machine-readable instructions. The thermal management controller may receive a high temperature alert generated by at least one of a plurality of communicably coupled memory resources. The high temperature alert may indicate that a temperature of the at least one communicably coupled memory resource is at or above a first temperature threshold. The thermal management controller may also restrict, throttle, limit, or otherwise control data traffic to and/or from the at least one communicably coupled memory resource that generated the high temperature alert.

A memory resource is provided. The memory resource may include at least one thermal sensor to measure a temperature of the memory resource and a storage register that includes data indicative of a first temperature threshold, the first temperature threshold representative of a temperature in the memory resource at or above which a memory controller will halt traffic to the memory resource. The memory resource may additionally include a storage register that includes data indicative of a second temperature threshold, the second temperature threshold representative of a temperature in the memory resource at or below which a memory controller will permit traffic to the resource. The memory resource may also include an first output pin and a register. The memory resource may include a comparator that compares the temperature of the memory resource to the first temperature threshold and to the second temperature threshold. Responsive to a temperature of the memory resource at or above the first temperature threshold, the memory resource may set the first output pin to a first logical state and the register to a first logical state. Responsive to the temperature of the memory resource at or below the second temperature threshold, the memory resource may set the first output pin to a second logical state.

A memory resource thermal monitoring method is provided. The method may include a thermal sensor in a memory resource measuring a temperature of the respective memory resource. A memory resource comparator may compare the measured temperature of the memory resource to a first temperature threshold. Responsive to detecting the temperature of the memory resource at or above the stored first temperature threshold value, the memory resource comparator may set a first output bit to a first logical state. Responsive to detecting the temperature of the memory resource at or above the stored first temperature threshold value, a memory resource thermal management controller may restrict, throttle, or otherwise limit memory traffic flow to and/or from the respective memory resource. Responsive to detecting the temperature of the memory resource at or above the stored first temperature threshold, the memory resource comparator may compare the temperature of the memory resource to a second temperature threshold. Responsive to measuring the temperature of the memory resource at or below the stored second temperature threshold, the memory resource comparator may set the first output bit to a second logical state.

A memory thermal monitoring system is provided. The system may include a means for measuring a temperature of the respective memory resource. The system may also include a means for comparing the measured temperature of the memory resource to a first temperature threshold. The system can include a means for setting an first output bit to a first logical state responsive to detecting the measured temperature of the memory resource at or above the stored first temperature threshold. The system may include a means for restricting, throttling, controlling, or otherwise limiting data traffic flow to and/or from the memory resource responsive to detecting the measured temperature of the memory resource at or above the stored first temperature threshold. The system can further include a means for comparing the temperature of the memory resource to a second temperature threshold value stored in the memory resource responsive to detecting the measured temperature of the memory resource at or above the stored first temperature threshold value. The system may additionally include a means for setting the first output bit to a second logical state responsive to measuring the temperature of the memory resource at or below the stored second temperature threshold.

FIG. 1 is an illustrative memory resource thermal management and management system 100, in accordance with at least one embodiment of the present disclosure. The system 100 includes any number of memory resources 110A-110*n* (collectively "memory resources 110") that are each communicably coupled to a memory resource thermal management controller 150, in accordance with at least one embodiment of the present disclosure. Each of the memory resources 110A-110*n* includes at least one respective comparator 120A-120*n* (collectively "comparators 120") that are communicably coupled to at least one respective thermal sensor 122A-122*n* (collectively "thermal sensors 122"). In embodiments, the thermal sensor 122 provides a real-time signal that includes information indicative of the temperature of the memory resource 110 to the respective comparator 120. The system 100 may include any device having data storage capabilities. Such devices include, without limitation, cellular telephones, smartphones, wearable computing devices, portable computing devices, ultraportable computing devices, netbooks, laptops, desktops, workstations, servers, and the like.

Each of the memory resources 110A-110*n* includes data indicative of a respective first, (e.g., "HIGH SET") threshold 112A-112*n* (collectively "first thresholds 112"). The first temperature threshold may represent a threshold at or above which the memory resource thermal management controller 150 may restrict, throttle, or otherwise limit data traffic to the respective memory resource 110. Each of the memory resources 110A-110n includes a respective second temperature (e.g., "LOW SET") threshold 114A-114n (collectively "second thresholds 114"). The second temperature threshold 114 may represent a threshold at or below which the memory resource thermal management controller 150 may resume data traffic to the respective memory resource 110.

Each of the memory resources 110A-110n includes a respective first output (e.g., "ALERT#") pin 124A-124n (collectively "first output pins 124"). In embodiments, the comparator 120 in each of the memory resource 110 may alter, adjust, or control the logic state of the first output pin 124 based at least in part on a measured temperature of the respective memory resource 110 as detected by the thermal sensor 122. For example, the comparator 120 may drive the first output pin 124 to a first logical state (e.g., a HIGH logic state or a logical "1") when the temperature of the memory resource 110 as measured by the thermal sensor 122 is at or above the first temperature threshold 112 for the respective memory resource 110. For example, the comparator 120 may drive the first output pin 124 to a second logical state (e.g., a LOW logic state or a logical "0") when the temperature of the memory resource 110 as measured by the thermal sensor 122 is at or below the second temperature threshold 114 for the respective memory resource 110.

The first output pins 124 from any number of memory resources 110 may be communicably coupled together to provide a single input to a thermal management controller 150. In such an instance, the first output pins 124 from all of the memory resources 110 are coupled in a wired logical "OR" arrangement such that a change in the logical state of one or more first output pins 124 will be received by the communicably coupled thermal management controller 150.

Each of the memory resources 110A-110n includes a respective register (e.g., "STATUS REGISTER") 126A-126n (collectively "registers 126"). The register provides a data storage area in the memory resource where data indicative or representative of a thermal state of the memory resource 110 may be stored or written. In some embodiments, the register 126 may include a single bit that is set by the comparator 120. In some embodiments, the register 126 may include a number of bits. In some embodiments, the register 126 may include one or more bytes sufficient to store a limited quantity of information, such as a message or a temperature as sensed by the sensor 122. Although depicted in FIG. 1 as included in the respective memory register 110, in some embodiments, the register 126 may be resident in a storage device external to the respective memory register 110.

In embodiments, the comparator 120A-120n in each of the memory resources 110A-110n may alter, adjust, control, or write the data stored or otherwise retained in the respective register 126A-126n. In at least some implementations when the thermal management controller 150 receives or otherwise detects a change in logic state of an first output pin 124 in a memory resource 110, the thermal management controller 150 may read the contents of each of the registers 126 to determine the address or identifier associated with the specific memory resource 110 experiencing the high thermal condition. Using such identification information, the thermal management controller 150 may perform corrective measures to reduce, mitigate, remedy, ameliorate, correct, or otherwise address the high thermal condition in the memory resource 110. Such permits the rapid detection and identification of memory resources 110 experiencing high thermal conditions within the system 100—thereby improving data integrity and reliability in the system 100.

The system 100 includes a number of conductors which may be in the form of one or more buses for communication between each of the plurality of memory resources 110 and the thermal management controller 150. Although three buses are depicted in FIG. 1, any number of conductors or buses (e.g., a single, multifunction bus) may be equally substituted. As depicted in FIG. 1, in embodiments, the thermal management controller 150 bidirectionally communicates with each of the memory resources 110 via a communications or command (CMD) bus 152. In embodiments, the thermal management controller 150 causes the bidirectional transfer of data to and from each of the memory resources 110 via the command bus 152. Also as depicted in FIG. 1, in embodiments, the status of each of the first output pins 124 in each of the memory resources 110 may be communicated to the thermal management controller 150 via a alert bus 154. In at least some embodiments, the alert bus 154 may effectively combine the memory resources 110 using a logical "OR" such that a change in logical state of any one of the first output pins 124 is detectable by the thermal management controller 150. Finally, as depicted in FIG. 1, in embodiments, the contents of the registers 126 for each of the memory resources 110 may be bidirectionally communicated between each of the memory resources 110 and the thermal management controller 150. In some implementations, the comparator 120 in each of the memory resources 110 may cause data to be written to the respective register 126 in the memory resource 110. In some implementations, the thermal management controller 150 may cause data to be written to the register 126.

Each memory resource 110 may include any number or combination of data storage structures, devices, or systems. Although binary data storage is envisioned, the embodiments disclosed herein may apply equally to other data storage regimes. In some implementations, as the storage structure in each memory resource is written, refreshed, and rewritten, thermal energy in the form of heat may accumulate within the memory resource 110. If the rate of thermal energy accumulation exceeds the thermal energy dissipation rate of the memory resource 110, the temperature of the memory resource 110 will increase. Such temperature increases or accumulations of thermal energy may adversely impact the speed, reliability, or stability of the respective memory resource 110.

In some instances, each of at least some of the plurality of memory resources 110 may include, but is not limited to, one or more phase-change memory modules. A phase-change memory module incorporates phase-change memory, a type of flash random access memory (RAM) that stores data by changing a crystal solid to an amorphous state. For example, the memory resources 110 can include a non-volatile memory and may include NAND memory included in non-volatile memory chips, NOR memory or some other suitable non-volatile memory, such as, phase change memory (PCM), a byte addressable three dimensional cross point memory, a resistive memory, nanowire memory, ferroelectric transistor random access memory (FeTRAM), magnetoresistive random access memory (MRAM) memory that incorporates memristor technology, spin transfer torque (STT)-MRAM, byte addressable random access non-volatile memory, to name a few. In embodiments, at least some of the plurality of memory resources 110 may include two or more types of data storage media. Each of the memory resources 110 may have the same or different storage capacity. Each of the memory resources 110 may have a storage capacity of about 512 MB or more, about 1 GB or more, about 5 GB or more, about 10 GB or more, about 50 GB or more or about 100 GB or more.

At least a portion of data storage in each of the memory resources 110 may be dedicated to the storage of data representative or indicative of at least one high temperature threshold, 112. In embodiments, at or above the first threshold temperature 112, the memory resource 110 provides an alert to the thermal management controller 150. In response to receiving the high temperature alert from a memory resource 110, the thermal management controller 150 may identify the respective memory resource 110 and reduce or even halt data flow to/from the respective memory resource 110. In some implementations, the first threshold temperature 112 may be a temperature or a temperature range at or above which the integrity, reliability, or performance of the memory used in the memory resource is compromised beyond one or more defined threshold values (e.g., threshold values representative of an acceptable level of data integrity or reliability in the memory).

In some embodiments, the first threshold temperature 112 data may be written to the storage location by the thermal management controller 150. In some embodiments, the first 112 temperature data may be written to the storage location by the comparator 120 in the respective memory resource 110. In some embodiments, the first threshold temperature 112 data may be written to the storage location by a system user, for example via one or more communicably coupled user interfaces. In some implementations, the first threshold temperature 112 may be stored in a single memory location external to the memory resources 110 and accessible to the comparator 120 logically associated with the respective memory resource. In some implementations, the first threshold temperature 112 may be stored in a single or common memory location accessible to all of the comparators 120.

In some implementations, the first threshold temperature 112 value may be the same for some or all of the memory resources 110. In some implementations, the first threshold temperature 112 temperature value may be different for some or all of the memory resources 110. In some embodiments, the first threshold temperature 112 temperature value for each memory resource 110 may be based at least in part on the type of storage devices (e.g., phase-change, electrostatic, electromagnetic) used to provide the respective memory resource 110.

In some instances, the first threshold temperature 112 may include data representative or indicative of a plurality of high temperature thresholds. In such instances, a measured temperature at or above a specific first threshold temperature 112 value may cause the thermal management controller 150 to stepwise reduce the flow of data to the respective memory resource 110. Such an arrangement beneficially eliminates the "all or nothing" approach of a single first threshold temperature 112 and provides the ability to operate the memory resource in a stepwise manner until the temperature of the memory resource falls to within an acceptable value. For example, above a first temperature $T_1$, data flow to/from the memory resource may be restricted to 75% maximum data flow rate, above temperature $T_2$ to 50% maximum data flow rate, above temperature $T_3$ to 25% maximum data flow rate, and above temperature $T_4$ data flow rate to the respective memory resource is temporarily or permanently halted.

At least a portion of data storage in each of the memory resources 110 may be dedicated to the storage of data representative or indicative of at least one second temperature threshold 114. At or below the second threshold temperature 114, the memory resource 110 removes, cancels, suspends, or otherwise temporarily or permanently terminates the high temperature alert to the thermal management controller 150. In response to the removal, cancelation, suspension, or termination of the high temperature alert from a memory resource 110, the thermal management controller 150 may at least partially restore data flow to/from the memory resource 110. In some implementations, the second threshold temperature 114 may be a temperature or a temperature range sufficiently below the first threshold temperature 112 (e.g., about 2° F., about 5° F., about 10° F., about 15° F., or about 20° F.) such that a deadband exists between the first threshold temperature and the second threshold temperature. Such a deadband may advantageously reduce or even eliminate "chatter" (i.e., repeated generation of alerts) when the memory resource temperature hovers at the first threshold temperature 112.

In some implementations, the second threshold temperature 114 may be the same for some or all of the memory resources 110. In some implementations, the second threshold temperature 114 may be different for some or all of the memory resources 110. In some embodiments, the second threshold temperature 114 for each memory resource 110 may be based at least in part on the type of storage devices (e.g., phase-change, electrostatic, electromagnetic) used to provide the respective memory resource 110.

In some embodiments, the second threshold temperature 114 may be written to the storage location by the thermal management controller 150. In some embodiments, the second threshold temperature 114 may be written to the storage location by the comparator 120 in the respective memory resource 110. In some embodiments, the second threshold temperature 114 may be written to the storage location by a system user, for example via one or more communicably coupled user interfaces.

Each of the memory resources includes one or more comparators 120. Each of the comparators may include any number or combination of systems and devices capable of comparing the parameters of two or more signals and providing a defined output based at least in part on the results of the comparison. As depicted in FIG. 1, the comparator 120 in each memory resource 110 receives a signal from a communicably coupled temperature sensor 122. The comparator 120 also receives data indicative of the first threshold temperature 112 and the second threshold temperature 114. In some implementations, the one or more comparators 120 may be included or otherwise incorporated into one or more storage devices included in the memory resource 110. In some implementations, the one or more comparators 120 may be a stand-alone device that is communicably coupled to the memory resource 110.

The comparator 120 compares the received temperature signal against the first threshold temperature 112. When the measured temperature of the memory resource exceeds the stored first threshold temperature 112, the comparator drives the first output pin 124 to a first logic state. The first logic state may be either a HIGH logic state or a LOW logic state. In some implementations, the first logic state may be a HIGH logic state (i.e., a binary HIGH state or a logical "1" value). In some implementations, when the measured temperature of the memory resource exceeds the first threshold temperature 112, the comparator may write a defined data string that includes one or more bits of information to the register 126. The data written to the register 126 may include data indicative of the high temperature condition existent within the memory resource 110. In embodiments, the presence of defined data in the register 126 may permit the thermal management controller 150 to identify which memory resource 110 is experiencing the high thermal condition event.

The temperature sensor 122 may include any number or combination of systems and devices capable of measuring the temperature of the memory resource 110 and generating a signal that includes data either indicative of or representative of the temperature of the memory resource 110. The temperature sensor 122 may include a single sensor or may include an array of sensors distributed about the memory resource 110. The temperature sensor 122 is communicably coupled to the comparator 120 and may be communicably coupled to one or more other devices or systems, for example the thermal management controller 150.

The thermal management controller 150 may include any number of combination of systems and devices capable of controlling, restricting, or otherwise adjusting the flow of data to and/or from each one of some or all of the plurality of memory resources 110. The thermal management controller 150 may adjust the flow of data to and/or from a particular memory resource 110 upon receipt of a high temperature alert from the respective memory resource 110. In some implementations, the thermal management controller 150 may simply halt the flow of data to/from the memory resource 110 upon receipt of the alert from the memory resource 110. In some implementations, the thermal management controller 150 may stepwise adjust the flow of data to/from the memory resource 110 upon receipt of a defined number of alerts from the respective memory resource 110, each of the defined number of alerts indicative of a particular temperature being detected within the memory resource 110.

The thermal management controller 150 may also permit the resumption of data flow to/from a memory resource 110 that previously experienced a high temperature thermal event. In some implementations, when the measured temperature (measured by temperature sensor 122) of the respective memory resource 110 is at or below the second threshold temperature 114, the comparator 120 may place the first output pin 124 in a second logic state. In other implementations, when the measured temperature (measured by temperature sensor 122) of the respective memory resource 110 is at or below the second threshold temperature 114, the thermal management controller 150 may cause the comparator 120 to place the first output pin 124 in a second logic state. The second logic state is different from the first logic state and may be either a HIGH logic state or a LOW logic state. Responsive to the placement of the first output pin 124 in the second logic state, in some embodiments, the thermal management controller 150 resumes the flow of data to/from the respective memory resource 110 that initially placed the first output pin 124 in the first logic state.

In some implementations, the resumption of data flow to/from the memory resource 110 is "all-or-nothing" such that full data flow to/from the memory resource 110 resumes immediately upon the temperature of the memory resource 110 falling to a level at or below the second threshold temperature 114. In some implementations, the resumption of data flow to/from the memory resource 110 may occur in a series of steps or stages based at least in part on the measured temperature of the memory resource 110. For example below a first temperature $T_1$, data flow to/from the memory resource 110 may be resumed at 25% of maximum data flow rate, below a second temperature $T_2$ data flow may be resumed at 50% of maximum data flow rate, below a third temperature $T_3$ data flow may be resumed at 75% of maximum data flow rate, and below a fourth temperature $T_4$ data flow data flow may be resumed at full or maximum data flow rate.

In some implementations, the thermal management controller 150 may include one or more dedicated control circuits communicably coupled to each of the plurality of memory resources 110. In some implementations, the thermal management controller 150 may include a portion of an integrated control circuit. For example, the thermal management controller 150 may include a portion of an integrated processor, microprocessor, or memory controller. The thermal management controller 150 may include one or more digital signal processors (DSPs), one or more reduced instruction set computers (RISCs), one or more systems on a chip (SoCs), one or more processors, one or more single or multi-core microprocessors, or any similar device capable of receiving one or more alert signals and, in response, providing one or more outputs capable of limiting, restricting, adjusting, or halting the flow of data to/from the memory resource experiencing a high temperature thermal event.

In some instances, the thermal management controller 150 may include an application specific circuit, for example an application specific integrated circuit (ASIC) or a field programmable gate array (FPGA). In some instances, the thermal management controller 150 may include one or more configurable circuits capable of reading and executing one or more sets or machine-readable instructions. Such machine-readable instructions may be stored in a storage device or memory integrated with the thermal management controller 150 or may be stored in an external storage device communicably coupled to the thermal management controller 150.

One or more communications buses may communicably couple the thermal management controller 150 to each of the memory resources 110. As depicted in FIG. 1, three (3) buses communicably couple the thermal management controller 150 to each of the plurality of memory resources 110. A command (CMD) bus 152 permits the thermal management controller 150 to bidirectionally communicate with each of the plurality of memory resources 110. Such commands may include, but are not limited to, commands that limit, alter, adjust, restrict or halt the flow of data to/from memory resources 110 experiencing a high temperature thermal condition. An alert bus 154 permits alert signals generated by each of the memory resources 110 to reach the thermal management controller 150. In at least some implementations, the alert signal can be an unaddressed signal indicative of an occurrence of a high temperature thermal event in one or more of the memory resources 110. The thermal management controller 150 may use data accessed via the status bus 156. The thermal management controller 150 may access data stored in the register 126 in each of the memory resources 110. In some implementations, the thermal management controller 150 may, via the status bus 156, bidirectionally communicate with the register 126 in each of the memory resources 110 to identify the memory resource 110 in which the high temperature event has occurred.

Figure 2:
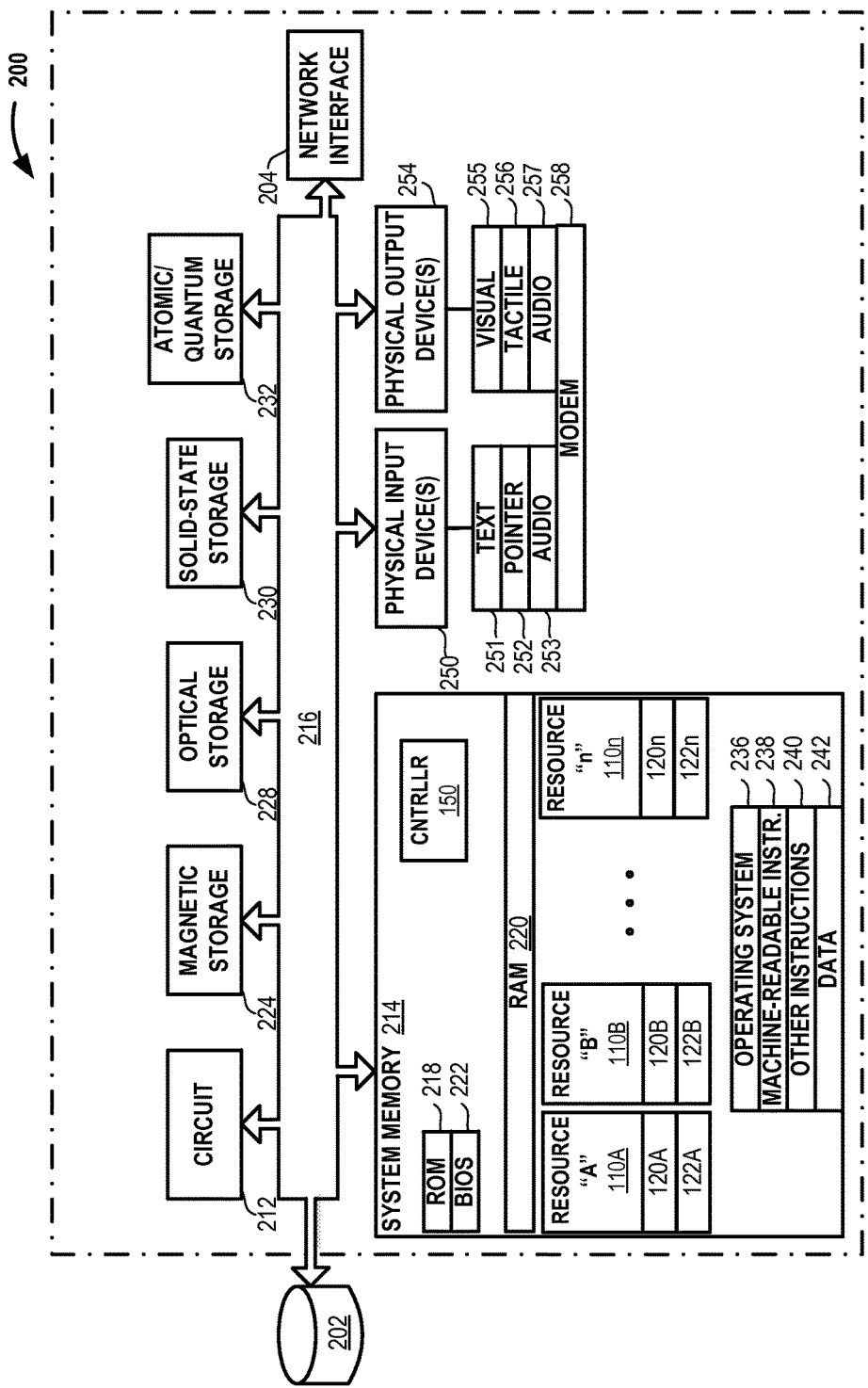
FIG. 2 is a block diagram of an illustrative system incorporating the example memory device thermal monitoring system, in accordance with at least one embodiment of the present disclosure.

FIG. 2 and the following discussion provide a brief, general description of the components forming an illustrative system 200 that includes an embodiment of the illustrative memory resource thermal monitoring and management system described in detail above with regard to FIG. 1, in accordance with at least one embodiment of the present disclosure. Although not required, some portion of the embodiments will be described in the general context of machine-readable or computer-executable instruction sets, such as program application modules, objects, or macros being executed by the system 200. Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or sub-sets of tasks may be performed by remote processing devices, which are linked through a communications network. In a distributed computing environment, tasks or task sub-sets may be located in both local and remote memory storage devices.

The system 200 includes one or more circuits 212, and may include one or more conductors 216 that communicably couple various system components including a system memory 214 to the one or more circuits 212. In embodiments, the one or more conductors 216 that interconnect at least some of the system components may employ any known bus structures or architectures. The one or more circuits 212 may include any number, type, or combination of devices. At times, the circuit 212 may be implemented in whole or in part in the form of semiconductor devices such as diodes, transistors and electrical components such as inductors, capacitors, and resistors. Such an implementation may include, but is not limited to any current or future developed single- or multi-core processor or microprocessor, such as: one or more systems on a chip (SOCs); central processing units (CPUs); digital signal processors (DSPs); graphics processing units (GPUs); application-specific integrated circuits (ASICs), field programmable gate arrays (FPGAs), and the like. Unless described otherwise, the construction and operation of the various blocks shown in FIG. 2 are of conventional design. As a result, such blocks need not be described in further detail herein, as they will be understood by those skilled in the relevant art.

The system memory 214 may include read-only memory ("ROM") 218 and random access memory ("RAM") 220. A portion of the ROM 218 may contain a basic input/output system ("BIOS") 222. The BIOS 222 may provide basic system functionality, for example by causing the one or more circuits to load the machine-readable instruction sets that cause at least a portion of the one or more circuits 212 to function as the thermal management controller 150. The system 200 may include one or more communicably coupled data storage devices, such as one or more magnetic storage devices 224, optical storage devices 228, solid-state electromagnetic storage devices 230, atomic or quantum storage devices 232, or combinations thereof.

The storage devices may include interfaces or controllers (not shown) communicatively coupling the respective storage device or system to the one or more conductors 216, as is known by those skilled in the art. The storage devices may contain machine-readable instruction sets, data structures, program modules, and other data useful to the thermal management controller 150. In some instances, one or more storage devices 202 may also externally communicably couple to the system 200.

Machine-readable instruction sets 238 and other instruction sets 240 may be stored in whole or in part in the system memory 214. Such instruction sets 238, 240 may be transferred from the storage device 202 and stored in the system memory 214 in whole or in part when executed by the thermal management controller 150. The machine-readable instruction sets 238 may include logic capable of providing the storage device thermal management capabilities described herein. For example, one or more machine-readable instruction sets 238 may cause the thermal management controller 150 to identify one or more memory resources 110 that are approaching or exceeding a first (e.g., first) temperature. One or more machine-readable instruction sets 238 may cause the thermal management controller 150 to restrict, throttle, control or otherwise limit data traffic to and/or from a memory resource 110 as the temperature of the resource increases. One or more machine-readable instruction sets 238 may cause the thermal management controller 150 to restrict, throttle, control or otherwise limit data traffic to and/or from a memory resource 110 continuously over a defined range as the temperature of the resource increases (i.e., data traffic to/from a memory resource is adjusted continuously over the defined range in a manner that is generally inversely proportional to the temperature of the respective memory resource). One or more machine-readable instruction sets 238 may cause the thermal management controller 150 to restrict, throttle, control or otherwise limit data traffic to and/or from a memory resource 110 stepwise over a defined range as the temperature of the resource increases (i.e., data traffic to/from a memory resource is stepwise or incrementally adjusted over the defined range in a manner that is generally inversely proportional to the temperature of the respective memory resource). One or more machine-readable instruction sets mat cause the thermal management controller 150 to completely halt traffic to a memory resource 110 at a temperature at or above first threshold (or HIGH SET) temperature 112. One or more machine-readable instruction sets may cause the thermal management controller 150 to resume traffic to a memory resource responsive to the temperature of the respective memory resource 110 at or below a defined second threshold (or LOW SET) temperature 114.

System users may provide, enter, or otherwise supply information and/or commands (e.g., acknowledgements, selections, confirmations, temperature thresholds, and similar) to the system 200 using one or more communicably coupled physical input devices 250 such as a text entry device 251 (e.g., keyboard), pointer 252 (e.g., mouse, touchscreen), or audio 253 input device. Some or all of the physical input devices 250 may be physically and communicably coupled to a system housing.

System users may receive output generated, at least in part, by the thermal management controller 150 via one or more physical output devices 254. In at least some implementations, the physical output devices 254 may include, but are not limited to, one or more visual display devices 255; one or more tactile output devices 256; one or more audio output devices 258, or combinations thereof. Some or all of the physical input devices 250 and some or all of the physical output devices 254 may be communicably coupled to the thermal management controller 150 via one or more wired or wireless interfaces.

Figure 3:
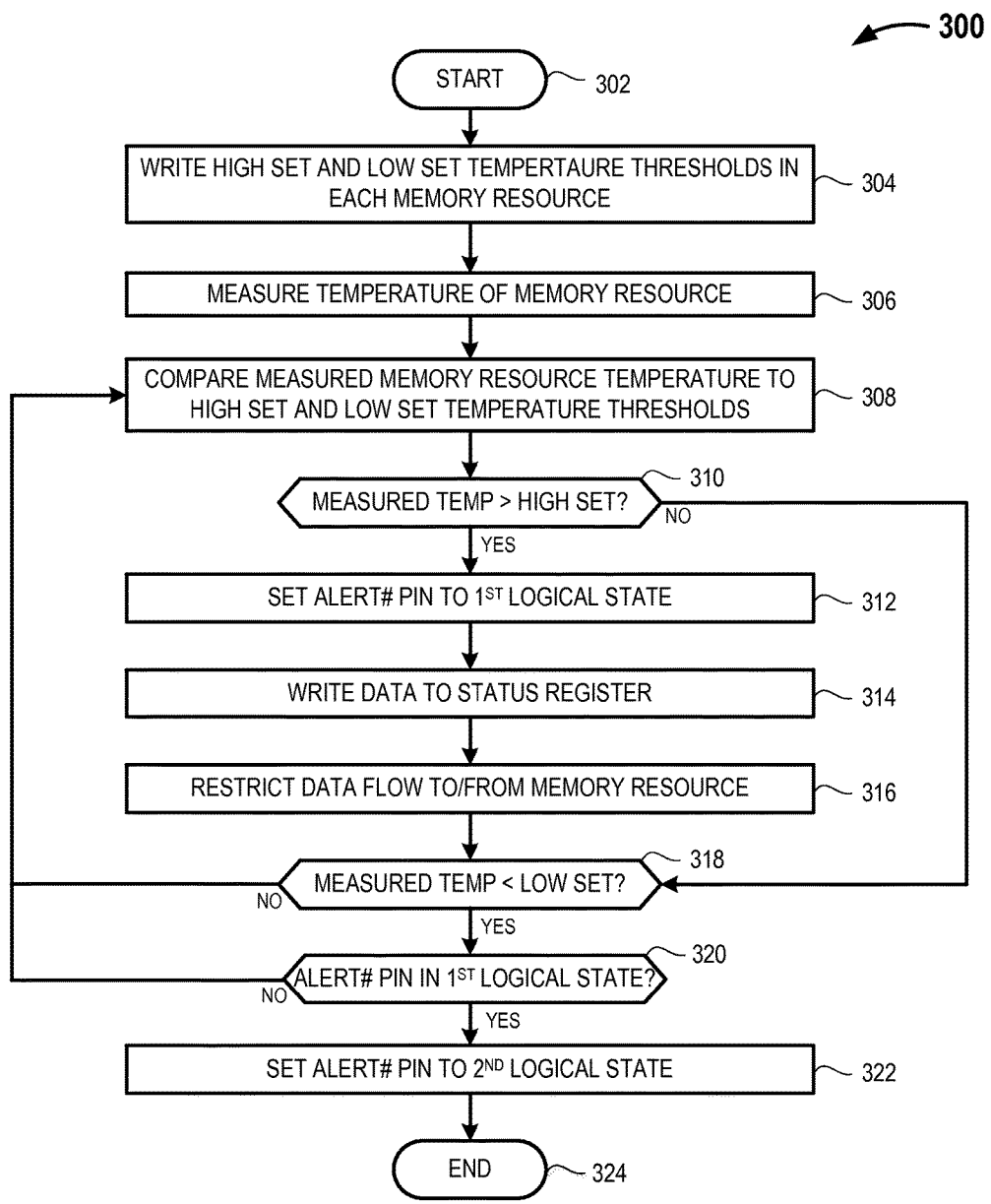
FIG. 3 is a high-level logic flow diagram of an example memory device thermal monitoring method, in accordance with at least one embodiment of the present disclosure.

For convenience, network interface 204, circuit 212, thermal management controller 150, system memory 214, physical input devices 250 and physical output devices 254 are illustrated as communicatively coupled to each other via the one or more conductors 216, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via one or more intermediary components (not shown). In some embodiments, the one or more conductors 216 are omitted and the components are coupled directly to each other using suitable wired or wireless connections. FIG. 3 is a high-level flow diagram of an illustrative method 300 of thermally monitoring and managing a plurality of memory resources 110, in accordance with at least one embodiment of the present disclosure. Data storage reliability and data integrity may be adversely affected by elevated temperatures in storage devices that form one or more memory resources for a system. For example, elevated temperatures in a phase change storage device may adversely impact the reliability and integrity of the data stored in the device. Providing a system having the capability of real-time thermal monitoring of memory resources 110 and real-time control of data flow to/from memory resources 110 based at least in part on the temperature of the respective memory resource 110 beneficially improves the reliability and integrity of data stored therein. The ability to identify, based on temperature, potential issues with memory resources permits the proactive slowing or even halting of data flow to/from the memory resource before data is compromised—such may advantageously be performed as a background task that is transparent to the system user and causes minimal disruption of the system. The method 300 commences at 302.

At 304, the first threshold temperature 112 and the second threshold temperature 114 are written to a storage register accessible by the comparators 120 or the thermal management controller 150. In some implementations, the first threshold temperature 112 and the second threshold temperature 114 may be stored in a respective memory location in each of the plurality of memory resources 110. In some implementations, the first threshold temperature 112 and the second threshold temperature 114 in each of the memory resources 110 may be the same, in other words each of the memory resources 110 has the same first temperature threshold 112 and the same second temperature threshold 114. In some implementations, the first threshold temperature 112 and the second threshold temperature 114 may be different for some or all of the memory resources 110. In some implementations, the first threshold temperature 112 may include a plurality of different temperature threshold values. In some implementations, the second threshold temperature 114 may include a plurality of different temperature threshold values. In some embodiments, the thermal management controller 150 may write either or both the first threshold temperature 112 and the second threshold temperature 114 to storage registers in each of the memory resources 110. In some embodiments, the thermal management controller 150 may select and write either or both the first threshold temperature 112 and the second threshold temperature 114 to storage registers in each of the memory resources 110 based at least in part on the number, type, or combination of storage devices included in the memory resource 110. In some implementations, the thermal management controller 150 may alter or adjust either or both the first threshold temperature 112 and the second threshold temperature 114 written to storage registers in each of the memory resources 110 based on one or more operational or environmental variables such as: the age of the memory resource 110, the ambient temperature, the ambient humidity, or the like.

In some implementations, the first threshold temperature 112 and the second threshold temperature 114 may be written to the storage register in the memory resource 110 by the memory resource manufacturer, retailer, supplier, or producer. In some implementations, the first threshold temperature 112 and the second threshold temperature 114 may be written by the system user to the storage register in the memory resource 110.

At 306, one or more sensors 122 measure the temperature of the memory resource 110. In some implementations, the one or more temperature sensors 122 may obtain a spot temperature reading of a location in the memory resource 110. In some implementations, the one or more temperature sensors 122 may obtain temperature readings at a number of locations in the memory resource 110.

In some instances, the one or more sensors 122 may obtain temperature readings at a number of locations in the memory resource 110 and the comparator 120 may average or otherwise mathematically combine the number of measured temperatures to obtain a single measured temperature value. In some instances, the one or more sensors 122 may obtain temperature readings at a number of locations in the memory resource 110 and the comparator 120 may select the highest measured temperature to obtain a single measured temperature value. In some instances, the one or more sensors 122 may obtain temperature readings at a number of locations in the memory resource 110 and the comparator 120 may select the lowest measured temperature to obtain a single measured temperature value. In some instances, the one or more sensors 122 may obtain temperature readings at a number of locations in the memory resource 110 and the comparator 120 may determine the mean temperature value or the mode temperature value to obtain a single measured temperature value.

At 308, the one or more comparators 120 compares the measured temperature value with the first threshold temperature 112 and the second threshold temperature 114.

At 310, the comparator 120 determines whether the measured temperature is at or above the first threshold temperature 112. If the measured temperature is at or above the first threshold temperature 112, method 300 continues at 312. If the measured temperature is below the first threshold temperature 112, method 300 continues at 318.

At 312, responsive to the measured temperature of the memory resource being at or above the first threshold temperature 112, the comparator 120 transitions or otherwise sets the first output pin 124 to a first logical state. In at least some implementations, the first logical state may be a binary HIGH logical state (i.e., a state representative of a digital "1" value).

At 314, responsive to the measured temperature of the memory resource being at or above the first threshold temperature 112, data indicative of or representative of the measured temperature of the memory resource 110 being at or above the first threshold temperature 112 is written to the register 114 of the respective memory resource 110. In some implementations, the comparator 120 may write the data indicative of or representative of the measured temperature of the memory resource 110 being at or above the first threshold temperature 112 to the register 114. In some instances, the thermal management controller 150 may write the data indicative of or representative of the measured temperature of the memory resource 110 being at or above the first threshold temperature 112 to the register 114. The presence of such data in the register 116 permits the thermal management controller 150 to identify the memory resource in which an elevated temperature has been measured.

At 316, the thermal management controller 150 restricts, limits, controls, adjusts, or halts the flow of data to/from the memory resource 110 identified as having a measured temperature that is at or above the first threshold temperature 112. In some implementations, the thermal management controller 150 may identify the specific memory resource 110 experiencing the high thermal condition and may restrict, limit, control, adjust, or halt the data flow to only the identified memory resource. In some implementations, the thermal management controller 150 may NOT identify the specific memory resource 110 experiencing the high thermal condition and may instead restrict, throttle, limit, control, adjust, or halt the data traffic to all memory resources 110.

At 218, the comparator 120 determines whether the measured temperature in the memory resource 110 is at or below the second threshold temperature 114. If the temperature of the memory resource 110 is at or below the second threshold temperature 114 at 318, the method 300 continues at 320. If the measured temperature of the memory resource 110 is NOT at or below the second threshold temperature 114 at 318, the method 300 returns to 308.

At 320, if the first output pin 124 is in the first logical state, the method continues at 322. If the first output pin 124 is NOT in the first logical state, the method 300 returns to 308.

At 322, responsive to the measured temperature of the memory resource 110 being at or below the second threshold temperature 114, the comparator 120 transitions or otherwise sets the first output pin 124 to a second logical state. In at least some implementations, the second logical state may be a binary LOW logical state (i.e., a state representative of a digital "0" value). The method 300 concludes at 324.

Figure 4:
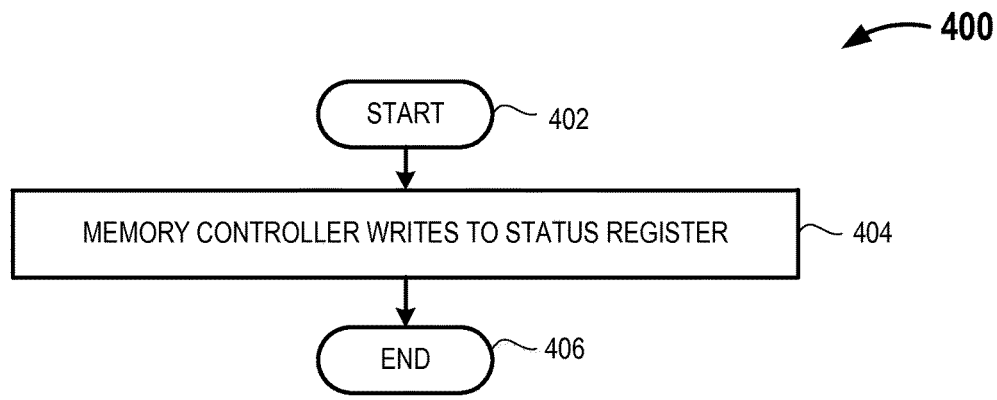
FIG. 4 is a high-level logic flow diagram of an example memory device thermal monitoring method, in accordance with at least one embodiment of the present disclosure.

FIG. 4 is a high-level flow diagram of an illustrative method 400 of writing data to the register 126 responsive to measuring a temperature in the memory resource 110 that is at or below the second threshold temperature 114, in accordance with at least one embodiment of the present disclosure. The thermal management controller 150 identifies the memory resource 110 having a measured temperature at or above the first threshold temperature 112 based on the data written to the register 126 of the respective memory resource 110. It is therefore desirable to overwrite or otherwise remove such data from the register 126 when the measured temperature of the respective memory resource 110 drops below a defined threshold. In some instances, the data in the register 126 is overwritten or otherwise removed when the measured temperature of the respective memory resource 110 drops below the second threshold temperature 114. A mode of operation where the memory resource 110 resets the data in the register 126 responsive to a measured temperature in the memory resource 110 that is at or below the second threshold temperature 114 may be referred to as a "NON-STICKY" mode of operation. The method 400 commences at 402.

At 404, the thermal management controller 150 writes data to the register 126 of the respective memory resource 110. In some implementations, the thermal management controller 150 may overwrite the existing data in the register 126 with a randomly or pseudo-randomly generated sequence. In some implementations, the thermal management controller 150 may overwrite the existing data in the register 126 with a defined data sequence. The method 400 concludes at 406.

Figure 5:
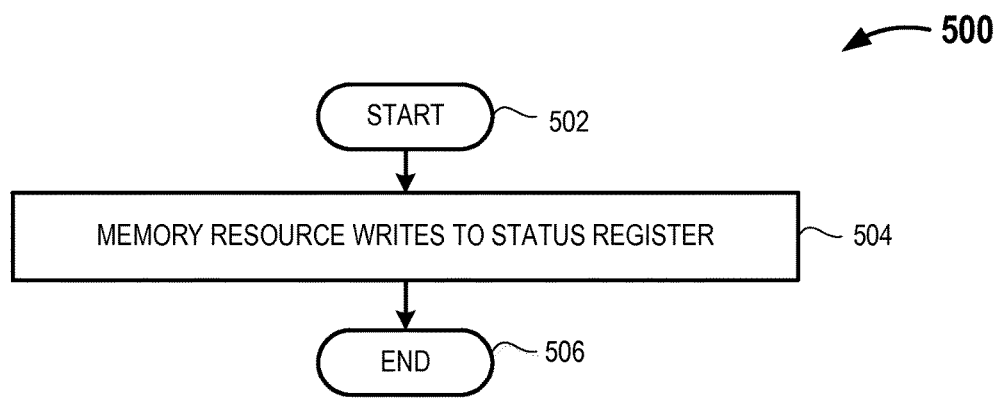
FIG. 5 is a high-level logic flow diagram of an example memory device thermal monitoring method, in accordance with at least one embodiment of the present disclosure.

FIG. 5 is a high-level flow diagram of an illustrative method 500 of writing data to the register 126 responsive to measuring a temperature in the memory resource 110 that is at or below the second threshold temperature 114, in accordance with at least one embodiment of the present disclosure. The thermal management controller 150 identifies the memory resource 110 having a measured temperature at or above the first threshold temperature 112 based on the data written to the register 126 of the respective memory resource 110. It is therefore desirable to overwrite or otherwise remove such data from the register 126 when the measured temperature of the respective memory resource 110 drops below a defined threshold. In some instances, the data in the register 126 is overwritten or otherwise removed when the measured temperature of the respective memory resource 110 drops below the second threshold temperature 114. A mode of operation where the thermal management controller 150 resets the data in the register 126 responsive to a measured temperature in the memory resource 110 that is at or below the second threshold temperature 114 may be referred to as a "STICKY" mode of operation. The method 500 commences at 502.

At 504, the memory resource 110 writes data to the register 126 of the respective memory resource 110. In some implementations, the memory resource 110 may overwrite the existing data in the register 126 with a randomly or pseudo-randomly generated sequence. In some implementations, the memory resource 110 may overwrite the existing data in the register 126 with a defined data sequence. In some implementations, the thermal management controller 150 may cause the memory resource 110 to write to the register 126. In some implementations, the thermal management controller 150 may cause the comparator 120 to write to the register 126. In some implementations, the memory resource 110 autonomously writes to the register 126 upon the occurrence of a defined event (e.g., the measured temperature of the memory resource 110 is at or below the second threshold temperature 114). The method 500 concludes at 506.

The following examples pertain to further embodiments that combine various aspects of the apparatuses, systems, and methods described in detail above. It is understood that the following examples are not exhaustive nor should they be construed as limiting or defining one or more aspects of the subject matter disclosed herein.

According to example 1 there is provided a memory resource thermal management system. The memory resource thermal monitoring system may include a plurality of memory resources, each including at least one comparator and at least one thermal sensor to measure a real-time temperature of the respective memory resource. Each of the memory resources may set an first output pin in the respective memory resource to a first logical state responsive to a real-time measured temperature of the respective memory resource at or above a first threshold temperature and set the first output pin to a second logical state responsive to the real-time measured temperature of the respective memory resource at or below a second threshold temperature. The memory resource thermal monitoring system may also include a thermal management controller communicably coupled to each respective one of the memory resources, the thermal management controller. The thermal management controller may restrict data flow to or from a communicably coupled memory resource when the first output pin in the respective memory resource is in the first logical state.

Example 2 may include elements of example 1 where the thermal management controller may further resume data flow to a communicably coupled memory resource when the first output pin in the respective memory resource is in the second logical state.

Example 3 may include elements of example 1 where the at least one comparator may write data indicative of a high temperature condition in the register responsive to the real-time measured temperature of the respective memory resource at or above the first temperature threshold and write data indicative of a high temperature condition to the register responsive to the respective memory resource setting the first output pin to the first logical state.

Example 4 may include the elements of example 1, and the thermal management controller may further stepwise adjust data flow to or from the communicably coupled memory resource, the stepwise adjustments based at least in part on the measured temperature of the respective memory resource, when the first output pin in the respective memory resource is in the first logical state.

Example 5 may include the elements of example 1, and may further include at least one command bus communicably coupling each of the plurality of memory resources to the thermal management controller, the command bus to communicate data to the plurality of memory resources.

Example 6 may include the elements any of examples 1 through 5 and may additionally include at least one alert bus communicably coupling at least the first output pin in each of the plurality of memory resources to the thermal management controller.

Example 7 may include elements of any of claims 1 through 5 where each of at least a portion of the plurality of memory resources may include at least one of: a phase change memory (PCM), a byte addressable three dimensional cross point memory, a resistive memory, a nanowire memory, a ferro-electric transistor random access memory (FeTRAM), a magnetoresistive random access memory (MRAM) memory that incorporates memristor technology, a spin transfer torque (STT)-MRAM, or a byte addressable random access non-volatile memory.

Example 8 may include elements of any of claims 1 through 5 where the thermal management controller may overwrite data indicative of a high temperature condition in the register responsive to the respective memory resource setting the first output pin to the second logical state.

Example 9 may include elements of any of examples 1 through 5 where the thermal management controller may resume data flow to and from a communicably coupled memory resource responsive to the respective memory resource setting the first output pin to the second logical state.

According to example 10, there is provided a memory resource controller. The memory resource controller may include a communications interface, and a thermal management controller. The thermal management controller may receive a high temperature indicator generated by at least one of a plurality of communicably coupled memory resources, the high temperature indicator indicative of a measured real-time temperature of the at least one communicably coupled memory resource at or above a first threshold temperature. The thermal management controller may also restrict data flow to the at least one memory resource responsive to the receipt of the high temperature indicator from the respective at least one memory resource.

Example 11 may include elements of example 10 where the thermal management controller may further receive a low temperature indicator generated by the at least one communicably coupled memory resource, the low temperature indicator indicative of a measured temperature of the at least one communicably coupled memory resource at or below a second threshold temperature.

Example 12 may include elements of example 11 where the thermal management controller may further, responsive to the receipt of the high temperature indicator from at least one memory resource, write data indicative of a high temperature condition to the register in the respective at least one memory resource.

Example 13 may include elements of example 12 where the thermal management controller may further overwrite the data indicative of the high temperature condition in the register responsive to the measured temperature of the memory resource at or below the second threshold temperature.

Example 14 may include elements of example 11 where the thermal management controller may further write data indicative of the first threshold temperature to at least some of the plurality of communicably coupled memory resources.

Example 15 may include elements of example 13 where the thermal management controller may further write data indicative of the second threshold temperature to at least some of the plurality of communicably coupled memory resources.

Example 16 may include elements of example 11 where the thermal management controller may further resume data flow to the at least one memory resource responsive to receipt of the low temperature indicator generated by the respective at least one communicably coupled memory resource.

According to example 17, there is provided a memory resource. The memory resource may include at least one thermal sensor to measure a real-time temperature of the memory resource. The memory resource may also include a storage register that includes data indicative of a first threshold temperature, the first threshold temperature representative of a temperature in the memory resource at or above which a memory controller will restrict data flow to the memory resource. The memory resource may also include a storage register that includes data indicative of a second threshold temperature, the second threshold temperature representative of a temperature in the memory resource at or below which a thermal management controller will permit traffic to the resource. The memory resource may include an first output pin and a register. The memory resource may also include a comparator to compare the measured real-time temperature of the memory resource to the first threshold temperature and to the second threshold temperature. Responsive to the measured temperature of the memory resource at or above the first threshold temperature, the memory resource may set the first output pin to a first logical state and write data indicative of the high temperature condition in the memory resource to the register. Responsive to the measured real-time temperature at or below the second threshold temperature, the memory resource may set the first output pin to a second logical state.

Example 18 may include elements of example 17 where the comparator may further, overwrite the data indicative of the high temperature condition in the memory register in the register responsive to the measured temperature of the memory resource at or below the second threshold temperature.

Example 19 may include elements of any of examples 17 or 18 where the memory resource may include at least one of: a phase change memory (PCM), a byte addressable three dimensional cross point memory, a resistive memory, nanowire memory, a ferro-electric transistor random access memory (FeTRAM), a magnetoresistive random access memory (MRAM) memory that incorporates memristor technology, a spin transfer torque (STT)-MRAM, or a byte addressable random access non-volatile memory.

According to example 20, there is provided a memory resource thermal monitoring method. The method may include measuring a real-time temperature of a memory resource using a thermal sensor disposed in the memory resource. The method may additionally include comparing the real-time measured temperature of the memory resource to a first threshold temperature stored in the memory resource by a comparator disposed at least partially in the memory resource. The method may further include setting, by the comparator, a first output pin in the memory resource to a first logical state responsive to detecting the real-time measured temperature of the respective memory resource at or above the stored first threshold temperature. The method may additionally include restricting data flow to and from the memory resource by a thermal management controller communicably coupled to the respective memory resource responsive to setting the first output pin in the respective memory resource to the first logical state.

Example 21 may include elements of example 20 and may further writing, by the comparator, data indicative that the real-time measured temperature of the memory resource is at or above the first threshold temperature to a register disposed in the memory resource responsive to the real-time measured temperature of the memory resource at or above the first threshold temperature.

Example 22 may include elements of example 21, and may additionally include comparing, by the comparator, the real-time measured temperature of the memory resource to a second threshold temperature and setting, by the comparator, the first output pin to a second logical state responsive to the real-time measured temperature of the memory resource at or below the stored second threshold temperature.

Example 23 may include elements of example 22 and may additionally include overwriting, by the comparator, the data indicative that the real-time measured temperature of the memory resource is at or above the first threshold temperature stored in the register responsive to the real-time measured temperature of the memory resource at or below the second threshold temperature.

Example 24 may include elements of example 22 and may additionally include overwriting, by the thermal management controller, the data indicative that the real-time measured temperature of the memory resource is at or above the first threshold temperature stored in the register responsive to setting the first output pin to the second logical state.

Example 25 may include elements of any of example 20 through 24 and may additionally include writing, by the thermal management controller, data representative of the first threshold temperature to the memory resource.

Example 26 may include elements of any of examples 20 through 24 and may additionally include writing, by the thermal management controller, data representative of the second threshold temperature to the memory resource.

Example 27 may include elements of example 20 where comparing the real-time measured temperature of a memory resource to a first threshold temperature stored in the memory resource may include comparing, by the comparator, the real-time measured temperature of at least one of: a phase change memory (PCM), a byte addressable three dimensional cross point memory, a resistive memory, nanowire memory, a ferro-electric transistor random access memory (FeTRAM), a magnetoresistive random access memory (MRAM) memory that incorporates memristor technology, a spin transfer torque (STT)-MRAM, or a byte addressable random access non-volatile memory disposed in the memory resource to the first threshold temperature.

According to example 28, there is provided a memory resource thermal management system. The system may include a means for measuring a real-time temperature of the respective memory resource. The system may also include a means for comparing the measured temperature of the memory resource to a first threshold temperature. The system may also include a means for setting an first output pin to a first logical state responsive to detecting the temperature of the respective memory resource at or above the first temperature threshold. The system may further include a means for restricting, by a thermal management controller, a data flow to the respective memory resource responsive to setting the first output pin to the first logical state.

Example 29 may include elements of example 28 and may additionally include a means for comparing the temperature of the memory resource to a second threshold temperature and a means for setting the first output pin to a second logical state responsive to the real-time measured temperature of the memory resource at or below the second threshold temperature.

Example 30 may include elements of example 28 and may additionally include a means for writing data indicative that the temperature of the memory resource is at or above the first threshold temperature to a register disposed in the memory resource responsive to the real-time measured temperature of the memory resource at or above the first threshold temperature.

Example 31 may include elements of example 30 and may additionally include a means for writing data indicative that the temperature of the memory resource is at or below the second threshold temperature to the register responsive to the real-time measured temperature of the memory resource at or below the second threshold temperature.

Example 32 may include elements of example 31 and may additionally include a means for overwriting data indicative that the temperature of the memory resource is at or above the first threshold temperature stored in the register responsive to the real-time measured temperature of the memory resource at or below the second threshold temperature.

Example 33 may include elements of example 31 and may additionally include a means for overwriting data indicative that the temperature of the memory resource is at or above the first threshold temperature stored in the register responsive to setting the first output pin to the second logical state.

Example 34 may include elements of any of examples 28 through 33 and may additionally include a means for writing data representative of the first threshold temperature to the memory resource.

Example 35 may include elements of any of examples 28 through 33 and may additionally include a means for writing data representative of the second threshold temperature to the memory resource.

Example 36 may include elements of example 28 where the means for comparing a temperature of a memory resource to a first threshold temperature may include a means for comparing the real-time measured temperature of at least one of: a phase change memory (PCM), a byte addressable three dimensional cross point memory, a resistive memory, nanowire memory, a ferro-electric transistor random access memory (FeTRAM), a magnetoresistive random access memory (MRAM) memory that incorporates memristor technology, a spin transfer torque (STT)-MRAM, or a byte addressable random access non-volatile memory disposed in the memory resource to the first threshold temperature.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A memory resource thermal monitoring system, comprising:
    a plurality of memory circuits, each of the plurality of memory circuits including:
        a status register to receive data indicative of a thermal state of a respective memory circuit;
        a first output pin;
        at least one thermal sensor, disposed in the memory circuit, the at least one thermal sensor to measure a real-time temperature of the respective memory circuit; and
        at least one comparator circuit disposed in the memory circuit, the at least one comparator coupled to the status register, the first output pin, and the at least one thermal sensor, the at least one comparator to:
            receive, from the at least one thermal sensor, a real-time measured temperature of the memory circuit;
            determine whether the received real-time measured temperature of the memory circuit is at or above a first threshold temperature;
            responsive to a determination that the real-time measured temperature of the memory circuit is at or above the first threshold temperature:
                set the first output pin in the memory circuit to a first logical state; and
                write data indicative of a high temperature condition to the status register; and
            determine whether the received real-time measured temperature of the memory circuit is at or below a second threshold temperature;
            responsive to a determination that the real-time measured temperature of the memory circuit is at or below the second threshold temperature, set the first output pin to a second logical state; and
    thermal management control circuitry coupled to each of the plurality of memory circuits, the thermal management control circuitry to, responsive to detection of at least one of the plurality of memory circuits having the first output pin in the first logical state:
        read data from the status register in each of the plurality of memory circuits to identify the memory circuit having the high temperature condition; and
        restrict data flow to or from the identified memory circuit while the first output pin in the respective memory circuit remains in the first logical state.

2. The system of claim 1, the thermal management control circuitry to further:
    resume data flow to the identified memory circuit responsive to receipt of a signal that includes data indicative of the first output pin in the identified memory circuit having the second logical state.

3. The system of claim 1, the thermal management control circuitry to further:
    stepwise adjust data flow to or from the identified memory circuit, the stepwise adjustments based at least in part on the real-time measured temperature of the identified memory circuit, when the first output pin in the identified memory circuit is in the first logical state.

4. The system of claim 1 wherein each of the plurality of memory circuits comprises at least one of: a phase change memory (PCM), a byte addressable three dimensional cross point memory, a resistive memory, a nanowire memory, a ferro-electric transistor random access memory (FeTRAM), a magnetoresistive random access memory (MRAM) memory that incorporates memristor technology, a spin transfer torque (STT)-MRAM, or a byte addressable random access non-volatile memory.

5. The system of claim 1, the thermal management control circuitry to further:
    overwrite data indicative of a high temperature condition in the status register of the identified memory circuit responsive to the at least one comparator circuit disposed in the identified memory circuit setting the first output pin to the second logical state.

6. A memory resource thermal management control circuit, comprising:
    a communications interface;
    thermal management control circuitry coupled to a plurality of memory circuits via the communications interface, the thermal management control circuitry to:

receive a signal that includes data representative of a high temperature indicator from at least one of the plurality of memory circuits;
  wherein a comparator circuit disposed in the at least one memory circuit generates the signal that includes the data representative of the high temperature indicator;
  wherein the comparator circuit generates the signal that includes the data representative of the high temperature indicator responsive to a determination that a measured real-time temperature of the at least one memory circuit meets or exceeds a first threshold temperature;
  wherein the comparator circuit generates the signal that includes the data representative of the high temperature indicator by causing a first output pin in the at least one memory circuit to enter a first logical state;
read a status register in each of the plurality of memory circuits to identify the at least one memory circuit having the measured real-time temperature that meets or exceeds the first threshold temperature responsive to a receipt of the signal indicative of the high temperature from the at least one of the plurality of memory circuits;
  wherein the status register contains data generated by the comparator circuit in the at least one memory circuit; and
restrict data flow to the identified at least one memory circuit responsive to the receipt of the high temperature indicator from the at least one memory circuit.

7. The memory resource thermal management control circuit of claim 6, the thermal management control circuitry to further:
receive a signal that includes data representative of a low temperature indicator from the identified memory circuit, the low temperature indicator generated by the comparator circuit disposed in the identified memory circuit, the low temperature indicator indicative of a measured temperature of the at least one memory circuit at or below a second threshold temperature;
  wherein the comparator circuit generates the signal that includes the data representative of the low temperature indicator by causing the first output pin in the at least one memory circuit to enter a second logical state.

8. The memory resource thermal management control circuit of claim 7, the thermal management control circuitry to further:
responsive to the receipt of the signal that includes data representative of the high temperature indicator from the identified memory circuit, write data indicative of a high temperature condition to a status register in the identified memory circuit.

9. The memory resource thermal management control circuitry of claim 8, the thermal management control circuit to further:
overwrite the data indicative of the high temperature indicator in the status register responsive to receipt of a signal that includes data indicative of the first output pin in the identified memory circuit having the second logical state.

10. The memory resource thermal management control circuit of claim 7, the thermal management control circuitry to further:
write data indicative of the first threshold temperature to each of at least some of the plurality of memory circuits.

11. The memory resource thermal management control circuit of claim 10, the thermal management control circuitry to further:
write data indicative of the second threshold temperature to each of at least some of the plurality of memory circuits.

12. The memory resource thermal management control circuit of claim 7, the thermal management control circuitry to further:
resume data flow to the identified memory circuit responsive to receipt of a signal, by the thermal management control circuitry, that includes data indicative of the first output pin in the identified memory circuit having the second logical state.

13. A memory resource thermal monitoring method, comprising:
measuring, by a thermal sensor disposed in the memory resource, a real-time temperature of a memory circuit using a thermal sensor disposed in the memory circuit;
comparing, by comparator circuitry disposed in the memory circuit, the real-time measured temperature of the memory circuit to a first threshold temperature value stored in the memory circuit by a comparator disposed in the memory circuit;
setting, by the comparator circuitry, an first output pin in the memory circuit to a first logical state responsive to detecting the real-time measured temperature of the memory circuit is at or above the first threshold temperature value;
writing, by the comparator circuitry, data indicative of a high temperature condition to a status register in the memory circuit responsive to the real-time measured temperature of the memory circuit at or above the first threshold temperature value;
reading, by thermal management control circuitry coupled to the memory circuit, data from the status register in the memory circuit to identify whether the real-time measured temperature of the memory circuit is at or above the first threshold temperature value responsive to receipt of a signal that includes data indicative of a first output pin in the memory circuit having the first logical state; and
restricting data flow to and from the memory circuit, by the thermal management control circuitry, the data flow restricted by the thermal management control circuitry responsive to receipt of a signal that includes data indicative of the first output pin in the memory circuit having the first logical state.

14. The method of claim 13, further comprising:
comparing, by the comparator circuitry, the real-time measured temperature of the memory resource to a second threshold temperature value; and
setting, by the comparator circuitry, the first output pin to a second logical state responsive to the real-time measured temperature of the memory circuit is at or below the second threshold temperature.

15. The method of claim 14, further comprising:
overwriting, by the thermal management control circuitry, the data indicative of a high temperature condition in the status register of the memory circuit responsive to receipt of a signal that includes data indicative of the first output pin in the memory circuit having the second logical state.

16. The method of claim 13, further comprising:
writing, by the thermal management control circuitry, data representative of the first threshold temperature value to a register disposed in the memory circuit.

17. The method of claim 14, further comprising:
writing, by the thermal management control circuitry, data representative of the second threshold temperature value to a register disposed in the memory circuit.

18. The method of claim 13 wherein comparing the real-time measured temperature of a memory circuit to a first threshold temperature comprises:
comparing, by the comparator circuitry, the real-time measured temperature of at least one of: a phase change memory (PCM), a byte addressable three dimensional cross point memory, a resistive memory, a nanowire memory, a ferro-electric transistor random access memory (FeTRAM), a magnetoresistive random access memory (MRAM) memory that incorporates memristor technology, a spin transfer torque (STT)-MRAM, or a byte addressable random access non-volatile memory to the first threshold temperature.

\* \* \* \* \*